US012698588B2

(12) United States Patent
Doi

(10) Patent No.: US 12,698,588 B2
(45) Date of Patent: Aug. 4, 2026

(54) INORGANIC FIBER SIZING AGENT AND INORGANIC FIBERS

(71) Applicant: Takemoto Oil & Fat Co., Ltd., Gamagori (JP)

(72) Inventor: Akihiro Doi, Gamagori (JP)

(73) Assignee: Takemoto Oil & Fat Co., Ltd., Gamagori (JP)

( * ) Notice: Subject to any disclaimer, the term of this patent is extended or adjusted under 35 U.S.C. 154(b) by 0 days.

(21) Appl. No.: 18/716,041

(22) PCT Filed: Dec. 2, 2022

(86) PCT No.: PCT/JP2022/044502
§ 371 (c)(1),
(2) Date: Jun. 3, 2024

(87) PCT Pub. No.: WO2023/106220
PCT Pub. Date: Jun. 15, 2023

(65) Prior Publication Data
US 2024/0417918 A1       Dec. 19, 2024

(30) Foreign Application Priority Data

Dec. 7, 2021       (JP) ................................ 2021-198784

(51) Int. Cl.
| | |
|---|---|
| *D06M 15/55* | (2006.01) |
| *C08G 59/24* | (2006.01) |
| *C08G 65/26* | (2006.01) |
| *C08K 5/101* | (2006.01) |
| *C08K 5/19* | (2006.01) |
| *C08K 5/42* | (2006.01) |
| *D06M 13/144* | (2006.01) |
| *D06M 13/224* | (2006.01) |
| *D06M 13/256* | (2006.01) |
| *D06M 101/40* | (2006.01) |

(52) U.S. Cl.
CPC .......... *D06M 15/55* (2013.01); *C08G 59/245* (2013.01); *C08G 65/2603* (2013.01); *C08K 5/101* (2013.01); *C08K 5/19* (2013.01); *C08K 5/42* (2013.01); *D06M 13/144* (2013.01); *D06M 13/224* (2013.01); *D06M 13/256* (2013.01); *C08K 2201/014* (2013.01); *D06M 2101/40* (2013.01); *D06M 2200/40* (2013.01)

(58) Field of Classification Search
CPC . C08K 5/101; C08K 5/19; C08K 5/42; C08K 2201/014; C08G 59/245; C08G 65/2603; D06M 15/55; D06M 13/144; D06M 13/224; D06M 13/256; D06M 2200/40
See application file for complete search history.

(56) References Cited

U.S. PATENT DOCUMENTS

| | | | |
|---|---|---|---|
| 2002/0061941 A1* | 5/2002 | Masamune | ................ C08J 3/03 |
| | | | 523/404 |
| 2004/0197565 A1 | 10/2004 | Sugiura et al. | |
| 2014/0228481 A1* | 8/2014 | Inoue | .................. D06M 15/564 |
| | | | 523/222 |
| 2017/0342275 A1 | 11/2017 | Bridges et al. | |
| 2021/0002820 A1 | 1/2021 | Maeda et al. | |
| 2023/0399794 A1* | 12/2023 | Hamajima | ............ D06M 15/59 |

FOREIGN PATENT DOCUMENTS

| | | | |
|---|---|---|---|
| CN | 101508759 A | 8/2009 | |
| CN | 109135955 A | 1/2019 | |
| EP | 4159915 A1 * | 4/2023 | .......... D06M 13/152 |
| EP | 4394122 A1 * | 7/2024 | .......... D06M 13/11 |
| JP | 2006-124844 A | 5/2006 | |
| JP | 4866701 B2 * | 2/2012 | .......... D06M 13/11 |
| JP | 2015-014056 A | 1/2015 | |
| JP | 6745565 B1 * | 8/2020 | .......... D06M 13/152 |
| JP | 2020-196882 A | 12/2020 | |
| JP | 6795228 B1 | 12/2020 | |
| JP | 2021-011654 A | 2/2021 | |
| JP | 7045742 B1 * | 4/2022 | .......... D06M 13/11 |
| WO | 02/099180 A1 | 12/2002 | |
| WO | WO 2022/091732 A1 | 5/2022 | |

OTHER PUBLICATIONS

Clarivate Analytics machine translation of JP 4866701 B2, to Sugiura et al. published Feb. 1, 2012 (Year: 2012).*
International Search Report dated Feb. 21, 2023, in connection with International Application No. PCT/JP2022/044502, and English translation thereof.
Extended European Search Report mailed Jan. 7, 2025 for European Application No. 22904149.6.

* cited by examiner

*Primary Examiner* — Jane L Stanley
(74) *Attorney, Agent, or Firm* — Wolf, Greenfield & Sacks, P.C.

(57) ABSTRACT

Disclosed is an inorganic fiber sizing agent that contains an epoxy compound, an aliphatic sulfonic acid salt, and a nonionic surfactant.

3 Claims, 1 Drawing Sheet

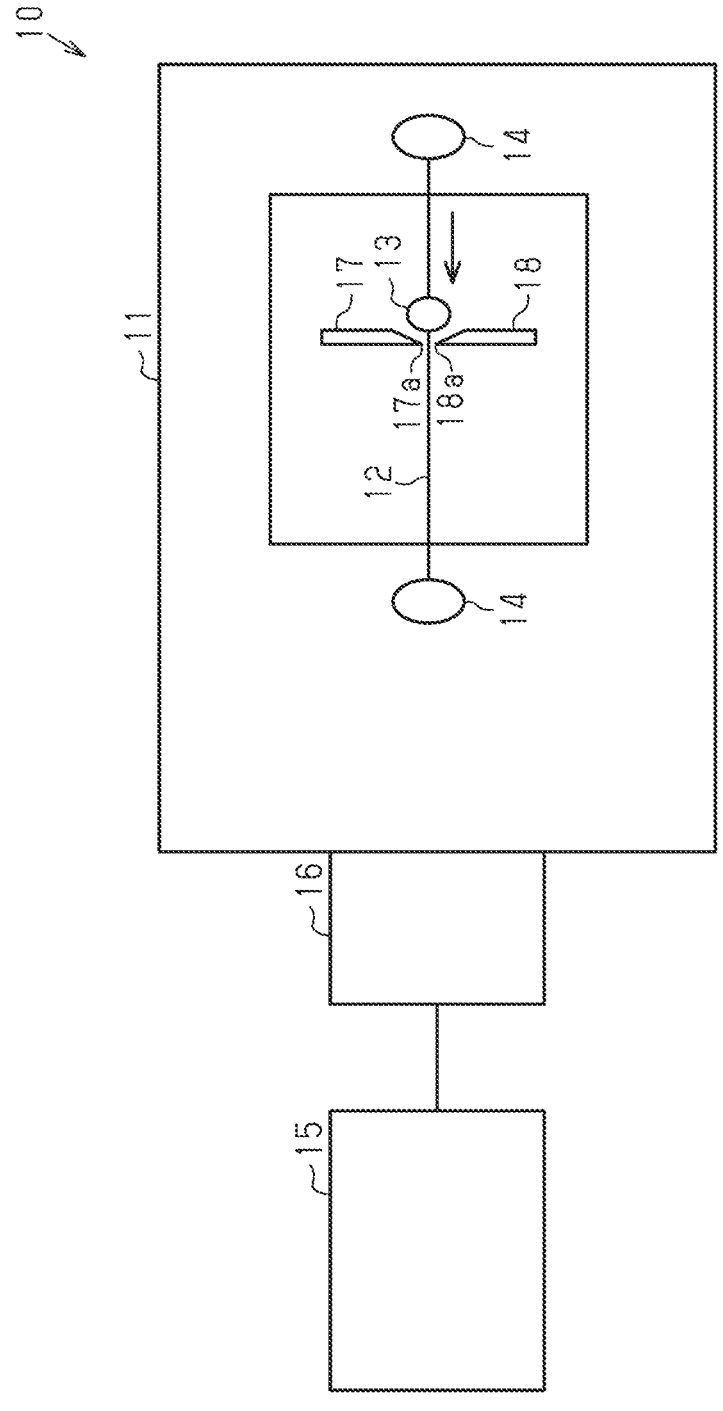

INORGANIC FIBER SIZING AGENT AND INORGANIC FIBERS

CROSS REFERENCE TO RELATED APPLICATIONS

This Application is a national stage filing under 35 U.S.C. 371 of International Patent Application Serial No. PCT/JP2022/044502, filed Dec. 2, 2022, which claims priority to Japanese application number 2021-198784, filed Dec. 7, 2021. The entire contents of these applications are incorporated herein by reference in their entirety.

TECHNICAL FIELD

The present invention relates to an inorganic fiber sizing agent and an inorganic fiber.

BACKGROUND ART

Fiber-reinforced resin composite materials, typically including inorganic fibers, such as carbon fibers, and a matrix resin that acts as a base material, such as a thermosetting resin, are known and widely used in various fields, including construction materials and transportation equipment. In order to improve the adhesive properties at the interface between the inorganic fibers and the matrix resin, a sizing agent is applied to the inorganic fibers.

For example, a known sizing agent is disclosed in Patent Document 1. The sizing agent of Patent Document 1 is used as an inorganic fiber sizing agent that is applied to carbon fibers. The inorganic fiber sizing agent of Patent Document 1 includes an epoxy compound as a main agent and contains a surfactant consisting of an anionic surfactant and a nonionic surfactant. An example of the anionic surfactant is a 120-mole polyoxyethylene adduct of an ammonium salt of monostyrenated phenyl ether sulfuric acid ester.

CITATIONS LIST

Patent Literature

Patent Document 1: Japanese Laid-Open Patent Publication No. 2006-124844

SUMMARY OF INVENTION

Technical Problem

There is a demand for suppression of fluff in inorganic fibers treated with the conventional inorganic fiber sizing agent. Additionally, there is a need to improve the adhesive properties between the inorganic fibers treated with the inorganic fiber sizing agent and a matrix resin in a fiber-reinforced resin composite material produced using the inorganic fibers and the matrix resin.

Solution to Problem

An inorganic fiber sizing agent to address the above-mentioned problem contains an epoxy compound (A), an aliphatic sulfonic acid salt (B), and a nonionic surfactant (C).

In the inorganic fiber sizing agent, it is preferable for the aliphatic sulfonic acid salt (B) to be an aliphatic sulfonic acid alkali metal salt.

In the inorganic fiber sizing agent, it is preferable for the aliphatic sulfonic acid salt (B) to include an aliphatic sulfonic acid salt (B1) that has a primary sulfonic acid group and an aliphatic sulfonic acid salt (B2) that has a secondary sulfonic acid group.

In the inorganic fiber sizing agent, it is preferable for the nonionic surfactant (C) to include a nonionic surfactant (C1) that has a single ester bond and an ether bond in its molecule.

In the inorganic fiber sizing agent, if the sum of the contents of the epoxy compound (A), the aliphatic sulfonic acid salt (B), and the nonionic surfactant (C) is taken as 100 parts by mass, the inorganic fiber sizing agent preferably contains the aliphatic sulfonic acid salt (B) at a content of greater than or equal to 0.01 parts by mass and less than or equal to 1.0 parts by mass.

An inorganic fiber to address the above-mentioned problem has the inorganic fiber sizing agent adhered thereto.

Advantageous Effects of Invention

The present invention succeeds in suppressing fluff in inorganic fibers treated with the inorganic fiber sizing agent. Additionally, it is possible to improve the adhesive properties between the inorganic fibers and a matrix resin in a fiber-reinforced resin composite material.

BRIEF DESCRIPTION OF DRAWINGS

FIG. 1 is a schematic view of a composite material interfacial property evaluation equipment used for adhesive property evaluations in the Example section.

DESCRIPTION OF EMBODIMENTS

First Embodiment

A first embodiment that specifically embodies an inorganic fiber sizing agent according to the present invention (hereinafter also referred to as "sizing agent") will now be described.

The sizing agent of the present embodiment contains an epoxy compound (A), an aliphatic sulfonic acid salt (B), and a nonionic surfactant (C).

By containing the nonionic surfactant (C), the sizing agent can suppress fluff in inorganic fibers to which the sizing agent is adhered. Also, by containing the epoxy compound (A) and the aliphatic sulfonic acid salt (B), the sizing agent can improve the adhesive properties between the inorganic fibers and a matrix resin in a fiber-reinforced resin composite material.

(Epoxy Compound (A))

The epoxy compound (A) has an epoxy group in its molecule. The epoxy compound (A) may be either a monoepoxy compound with one epoxy group in the molecule or a polyfunctional epoxy compound with two or more epoxy groups in the molecule.

Specific examples of the epoxy compound (A) include polyoxyalkylene-added p-tert-butylphenol monoglycidyl ether, bisphenol A diglycidyl ether, resorcinol diglycidyl ether, polypropylene glycol diglycidyl ether, trimethylolpropane polyglycidyl ether, pentaerythritol polyglycidyl ether, neopentyl glycol diglycidyl ether, 1,6-hexanediol diglycidyl ether, polyethylene glycol diglycidyl ether, polyglycerol polyglycidyl ether, alkyl glycidyl ether, polyoxyalkylene-added alkyl glycidyl ether, phenyl glycidyl ether, polyoxyalkylene-added phenyl glycidyl ether, and an amine type epoxy compound, such as a polymer of triglycidylamine or tetraglycidylamine.

The epoxy equivalent of the epoxy compound (A) is not particularly limited and is preferably greater than or equal to 50 and less than or equal to 1000, for example.

(Aliphatic Sulfonic Acid Salt (B))

The aliphatic sulfonic acid salt (B) is salt of a compound in which a sulfonic acid is bonded to an aliphatic hydrocarbon group. Also, the aliphatic sulfonic acid salt (B) includes a salt of a compound in which a sulfonic acid is bonded to a fatty acid ester with either a straight chain or a branched chain. The hydrocarbon group is not particularly limited, and examples thereof include a hydrocarbon group with greater than or equal to 8 and less than or equal to 24 carbon atoms.

The hydrocarbon group may be a saturated hydrocarbon group or an unsaturated hydrocarbon group. It may also be a straight-chain or branched-chain hydrocarbon group.

Specific examples of the straight-chain saturated hydrocarbon group include, octyl group, nonyl group, decyl group, undecyl group, dodecyl group, tridecyl group, tetradecyl group, pentadecyl group, hexadecyl group, heptadecyl group, octadecyl group, icosyl group, docosyl group, tricosyl group, and tetracosyl group.

Specific examples of the branched-chain saturated hydrocarbon group include isooctyl group, isononyl group, isodecyl group, isoundecyl group, isododecyl group, isotridecyl group, isotetradecyl group, isopentadecyl group, isohexadecyl group, isoheptadecyl group, isooctadecyl group, isoicosyl group, isodocosyl group, isotricosyl group, and isotetracosyl group.

The unsaturated hydrocarbon group may be an alkenyl group with one double bond, which is an unsaturated carbon bond, or, for example, an alkadienyl group or alkatrienyl group with two or more double bonds. It may also be an alkynyl group with one triple bond, which is an unsaturated carbon bond, or, for example, an alkadienyl group with two or more triple bonds. Specific examples of the straight-chain unsaturated hydrocarbon group with one double bond in the hydrocarbon group include octenyl group, nonenyl group, decenyl group, undecenyl group, dodecenyl group, tridecenyl group, tetradecenyl group, pentadecenyl group, hexadecenyl group, heptadecenyl group, octadecenyl group, icosenyl group, docosenyl group, tricosenyl group, and tetracosenyl group.

Specific examples of the branched-chain unsaturated hydrocarbon group with one double bond in the hydrocarbon group include isooctenyl group, isononenyl group, isodecenyl group, isoundecenyl group, isododecenyl group, isotridecenyl group, isotetradecenyl group, isopentadecenyl group, isohexadecenyl group, isoheptadecenyl group, isooctadecenyl group, isoicosenyl group, isodocosenyl group, isotricosenyl group, and isotetracosenyl group.

Examples of a fatty acid that makes up the fatty acid ester include those with the above-mentioned hydrocarbon group.

There is no particular restriction on the salt that makes up the aliphatic sulfonic acid salt (B), and examples thereof include a potassium salt, sodium salt, and other alkali metal salts, a magnesium salt, calcium salt, and other alkaline earth metal salts, an ammonium salt, a triethanolamine and other alkanolamine salts. Among these, an alkali metal salt is preferable as it can further improve the adhesive properties between the inorganic fibers and the matrix resin.

The aliphatic sulfonic acid salt (B) may be either an aliphatic sulfonic acid salt (B1) that has a primary sulfonic acid group or an aliphatic sulfonic acid salt (B2) that has a secondary sulfonic acid group. The aliphatic sulfonic acid salt (B) preferably includes both an aliphatic sulfonic acid salt (B1) that has a primary sulfonic acid group and an aliphatic sulfonic acid salt (B2) that has a secondary sulfonic acid group. By including both an aliphatic sulfonic acid salt (B1) that has a primary sulfonic acid group and an aliphatic sulfonic acid salt (B2) that has a secondary sulfonic acid group, the adhesive properties between the inorganic fibers and the matrix resin can be further improved.

(Nonionic Surfactant (C))

The nonionic surfactant (C) is not particularly limited and preferably includes a nonionic surfactant (C1) that has a single ester bond and an ether bond in its molecule. By including a nonionic surfactant (C1) that has a single ester bond and an ether bond in its molecule, fluff in the inorganic fibers to which the sizing agent is adhered can be more effectively suppressed.

Specific examples of the nonionic surfactant (C1) include an ester of palmitic acid and a compound with 6 moles of ethylene oxide and 2 moles of propylene oxide randomly added to 1-nonanol, an ester of palmitic acid and a compound with 5 moles of ethylene oxide added to 1-nonanol, an ester of lauric acid and a compound with 6 moles of ethylene oxide and 2 moles of propylene oxide randomly added to 2-ethylhexyl alcohol, an ester of lauric acid and a compound with 6 moles of ethylene oxide added to 2-ethylhexyl alcohol, an ester of stearic acid and a compound with 22 moles of ethylene oxide and 9 moles of propylene oxide randomly added to 1-butanol, an ester of stearic acid and a compound with 10 moles of ethylene oxide added to 1-butanol, an ester of oleic acid and a compound with 4 moles of ethylene oxide and 2 moles of propylene oxide randomly added to 1-hexanol, an ester of oleic acid and a compound with 7 moles of ethylene oxide added to 1-hexanol, an ester of lauric acid and a compound with 3 moles of ethylene oxide and 3 moles of propylene oxide randomly added to isotridecyl alcohol, an ester of lauric acid and a compound with 4 moles of ethylene oxide added to isotridecyl alcohol, an ester of lauric acid and a compound with 4 moles of ethylene oxide and 3 moles of propylene oxide randomly added to lauryl alcohol, an ester of lauric acid and a compound with 5 moles of ethylene oxide added to lauryl alcohol, an ester of hexanoic acid and a compound with 2 moles of ethylene oxide and 2 moles of propylene oxide randomly added to 2-decyltetradecanol, and an ester of hexanoic acid and a compound with 4 moles of ethylene oxide added to 2-decyltetradecanol.

Specific examples of the nonionic surfactant (C) besides the nonionic surfactant (C1) described above, that is, specific examples of a nonionic surfactant (C2) that does not include an ester bond in its molecule include a compound with 31 moles of ethylene oxide and 4 moles of propylene oxide randomly added to tristyrenated phenol, a compound with 27 moles of ethylene oxide and 3 moles of propylene oxide randomly added to distyrenated phenol, a compound with 17 moles of ethylene oxide added to tristyrenated phenol, a compound with 9 moles of ethylene oxide added to dodecyl alcohol, a compound with 6 moles of ethylene oxide and 2 moles of propylene oxide randomly added to isononanol, a compound with 15 moles of ethylene oxide added to dodecylamine, and a 40-mole polyoxyethylene adduct of monostyrenated phenyl ether.

These nonionic surfactants may be used alone or in combinations of two or more.

The sizing agent may also include an anionic surfactant, a cationic surfactant, or an amphoteric surfactant. These surfactants may be used alone or in combinations of two or more.

(Anionic Surfactant)

Any known anionic surfactant can be appropriately used as the anionic surfactant. Specific examples of the anionic surfactant include (1) a phosphoric acid ester salt of an aliphatic alcohol, such as a lauryl phosphoric acid ester salt, cetyl phosphoric acid ester salt, octyl phosphoric acid ester salt, oleyl phosphoric acid ester salt, or stearyl phosphoric acid ester salt, (2) a phosphoric acid ester salt of an adduct of at least one type of alkylene oxide selected from ethylene oxide and propylene oxide with an aliphatic alcohol, such as a polyoxyethylene lauryl ether phosphoric acid ester salt, polyoxyethylene oleyl ether phosphoric acid ester salt, or polyoxyethylene stearyl ether phosphoric acid ester salt, (3) an aromatic sulfonic acid salt, such as a dodecylbenzene sulfonic acid salt, (4) a sulfuric acid ester salt of an aliphatic alcohol, such as a lauryl sulfuric acid ester salt, oleyl sulfuric acid ester salt, or stearyl sulfuric acid ester salt, (5) a sulfuric acid ester salt of an adduct of at least one type of alkylene oxide selected from ethylene oxide and propylene oxide with an aliphatic alcohol, such as a polyoxyethylene lauryl ether sulfuric acid ester salt, polyoxyalkylene (polyoxyethylene, polyoxypropylene) lauryl ether sulfuric acid ester salt, or polyoxyethylene oleyl ether sulfuric acid ester salt, (6) a sulfuric acid ester salt of a fatty acid, such as a castor oil fatty acid sulfuric acid ester salt, sesame oil fatty acid sulfuric acid ester salt, tall oil fatty acid sulfuric acid ester salt, soybean oil fatty acid sulfuric acid ester salt, rapeseed oil fatty acid sulfuric acid ester salt, palm oil fatty acid sulfuric acid ester salt, lard fatty acid sulfuric acid ester salt, beef tallow fatty acid sulfuric acid ester salt, or whale oil fatty acid sulfuric acid ester salt, (7) a sulfuric acid ester salt of an oil or fat, such as a sulfuric acid ester salt of castor oil, sulfuric acid ester salt of sesame oil, sulfuric acid ester salt of tall oil, sulfuric acid ester salt of soybean oil, sulfuric acid ester salt of rapeseed oil, sulfuric acid ester salt of palm oil, sulfuric acid ester salt of lard, sulfuric acid ester salt of beef tallow, or sulfuric acid ester salt of whale oil, and (8) a fatty acid salt, such as a lauric acid salt, oleic acid salt, or stearic acid salt. Examples of a counterion for the anionic surfactant include an alkali metal salt, such as a potassium salt or sodium salt, an ammonium salt, and an alkanolamine salt, such as triethanolamine.

(Cationic Surfactant)

Any known cationic surfactant can be appropriately used as the cationic surfactant. Specific examples of the cationic surfactant include lauryltrimethylammonium chloride, cetyltrimethylammonium chloride, stearyltrimethylammonium chloride, behenyltrimethylammonium chloride, didecyldimethylammonium chloride, 1,2-dimethylimidazole, and triethanolamine.

(Amphoteric Surfactant)

Any known amphoteric surfactant can be appropriately used as the amphoteric surfactant. Specific examples of the amphoteric surfactant include a betaine type amphoteric surfactant.

The contents of the epoxy compound (A), the aliphatic sulfonic acid salt (B), and the nonionic surfactant (C) in the sizing agent are not particularly limited. If the sum of the contents of the epoxy compound (A), the aliphatic sulfonic acid salt (B), and the nonionic surfactant (C) is taken as 100 parts by mass, the sizing agent contains the aliphatic sulfonic acid salt (B) at a content of preferably greater than or equal to 0.01 parts by mass and less than or equal to 10.0 parts by mass, and more preferably greater than or equal to 0.01 parts by mass and less than or equal to 1.0 parts by mass. The content of the aliphatic sulfonic acid salt (B) being within the above ranges can further improve the adhesive properties between the inorganic fibers and the matrix resin.

Second Embodiment

Next, a second embodiment that specifically embodies an inorganic fiber according to the present invention will be described. For the second embodiment, the same arrangements as the first embodiment apply, except for the differences described below.

The inorganic fiber of the present embodiment has the sizing agent of the first embodiment adhered to its surface. A method of producing the inorganic fiber includes applying the sizing agent of the first embodiment to the inorganic fiber. Although there is no particular limit on the amount of sizing agent applied (excluding solvent), it is preferable to apply the sizing agent such that it constitutes greater than or equal to 0.01% by mass and less than or equal to 10% by mass of the inorganic fiber. Specifying such a numerical range can further improve effects such as the bundling properties of inorganic fibers.

(Inorganic Fiber)

There is no particular restriction on the type of the inorganic fiber used in the present embodiment, and examples thereof include a glass fiber, carbon fiber, ceramic fiber, metal fiber, mineral fiber, rock fiber, and slag fiber. Among these, a glass fiber and a carbon fiber are preferable because they can more effectively demonstrate the effects of the present invention. Examples of the carbon fiber include a PAN-based carbon fiber derived from an acrylic fiber, a pitch-based carbon fiber derived from pitch, a recycled carbon fiber, and a carbon fiber derived from a material such as a polyester fiber, polyethylene resin, phenol resin, cellulose resin, or lignin resin.

To apply the sizing agent of the first embodiment to the inorganic fiber, any commonly used industrial method is applicable. For example, a roller immersion method, a roller contact method, a spraying method, or a papermaking method can be used. The inorganic fiber to which the sizing agent has been applied can then be dried using any known method.

Third Embodiment

Next, a third embodiment that specifically embodies a composite material according to the present invention will be described. For the third embodiment, the same arrangements as the first and second embodiments apply, except for the differences described below.

The composite material is obtained by impregnating inorganic fibers, to which the sizing agent has been adhered by the second embodiment, with a matrix resin as a base material. There is no particular restriction on the form of the inorganic fibers when producing the composite material, and examples thereof include forms such as long fibers, short fibers, and nonwoven fabric.

(Matrix Resin)

The matrix resin is selected appropriately from known materials based on the intended purpose and application of the composite material. Specific examples of the matrix resin include epoxy resins, vinyl ester resins, polyamide resins, polyolefin resins, polyurethane resins, polycarbonate resins, polyester resins, PEEK resins, fluororesins, phenoxy resins, phenol resins, BMI resins, polyimide resins, polyimide resin precursors, and polyether sulfone resins. Among these, a thermosetting resin is preferably used because it demonstrates adhesion characteristics more effectively.

With the sizing agent and the inorganic fiber of the embodiments, the following actions and effects can be achieved.

(1) The sizing agent contains an epoxy compound (A), an aliphatic sulfonic acid salt (B), and a nonionic surfactant (C). By containing the nonionic surfactant (C), the sizing agent can suppress fluff in the inorganic fibers to which the sizing agent is adhered. Additionally, by containing the epoxy compound (A) and the aliphatic sulfonic acid salt (B), the sizing agent can improve the adhesive properties between the inorganic fibers and the matrix resin in the fiber-reinforced resin composite material.

(2) The aliphatic sulfonic acid salt (B) is an aliphatic sulfonic acid alkali metal salt. Therefore, it is possible to further improve the adhesive properties between the inorganic fibers and the matrix resin.

(3) The aliphatic sulfonic acid salt (B) includes both an aliphatic sulfonic acid salt (B1) that has a primary sulfonic acid group and an aliphatic sulfonic acid salt (B2) that has a secondary sulfonic acid group. Therefore, it is possible to further improve the adhesive properties between the inorganic fibers and the matrix resin.

(4) The nonionic surfactant (C) includes a nonionic surfactant (C1) that has a single ester bond and an ether bond in its molecule. Therefore, it is possible to more effectively suppress fluff in the inorganic fibers to which the sizing agent is adhered.

(5) If the sum of the contents of the epoxy compound (A), the aliphatic sulfonic acid salt (B), and the nonionic surfactant (C) is taken as 100 parts by mass, the sizing agent contains the aliphatic sulfonic acid salt (B) at a content of greater than or equal to 0.01 parts by mass and less than or equal to 1.0 parts by mass. Therefore, it is possible to further improve the adhesive properties between the inorganic fibers and the matrix resin.

Modification

The above-described embodiments can be modified as follows. The above-described embodiments and the following modification can be implemented in combination with each other, provided they are not technically inconsistent.

Within a range that does not impair the effects of the present invention, the sizing agent of the embodiments may further include a stabilizer, an antistatic agent, an electrostatic preventing agent, a binder, an antioxidant, an ultraviolet absorber, an antifoaming agent (silicone compound), a smoothing agent, water, an organic solvent, or any other ingredient commonly used in sizing agents for maintaining their quality.

EXAMPLES

Examples will now be provided below to more specifically describe the features and effects of the present invention; however, the present invention is not limited to these examples. In the following description of the working examples and comparative examples, part means part by mass.

Experimental Part 1 (Preparation of Sizing Agents)

Example 1

A sizing agent of Example 1 was prepared by mixing an epoxy compound (A), an aliphatic sulfonic acid salt (B), and a nonionic surfactant (C) as raw materials at content proportions indicated in Table 1.

Examples 2 to 41 and Comparative Examples 1 to 4

Sizing agents of Examples 2 to 41 and Comparative Examples 1 to 4 were prepared by mixing the respective ingredients in the content proportions indicated in Table 1.

The types and contents of the epoxy compounds (A), the types and contents of the aliphatic sulfonic acid salts (B), and the types and contents of the nonionic surfactants (C) are respectively indicated in the "Epoxy compound (A)" column, the "Aliphatic sulfonic acid salt (B)" column, and the "Nonionic surfactant (C)" column of Table 1. Nonionic surfactants (C1) that each have a single ester bond and an ether bond in their molecules and nonionic surfactants (C2) that do not have an ester bond in their molecules are also indicated in the "Nonionic surfactant (C)" column.

TABLE 1

| | Epoxy compound (A) | | Aliphatic sulfonic acid salt (B) | | Nonionic surfactant (C) | | | | Total for ingredients | Evaluation | |
| | | | | | (C1) | | (C2) | | | | |
| | Type | Parts by mass | Type | Parts by mass | Type | Parts by mass | Type | Parts by mass | Parts by mass | Adhesive properties | Fluff |
|---|---|---|---|---|---|---|---|---|---|---|---|
| Example 1 | A-1 | 47.5 | B-1 | 0.5 | X-1 | 20 | Y-1 | 32 | 100 | ◎◎◎ | ◎ |
| Example 2 | A-1 | 47.9 | B-1 | 0.1 | X-1 | 20 | Y-1 | 32 | 100 | ◎◎◎ | ◎ |
| Example 3 | A-1 | 47.1 | B-1 | 0.9 | X-1 | 20 | Y-1 | 32 | 100 | ◎◎◎ | ◎ |
| Example 4 | A-2 | 25 | B-1 | 0.5 | X-1 | 30 | Y-1 | 44.5 | 100 | ◎◎◎ | ◎ |
| Example 5 | A-2 | 70 | B-1 | 0.5 | X-1 | 3 | Y-1 | 26.5 | 100 | ◎◎◎ | ◎ |
| Example 6 | A-2 | 47.5 | B-1 | 0.5 | X-1 | 20 | Y-1 | 32 | 100 | ◎◎◎ | ◎ |
| Example 7 | A-3 | 47.5 | B-1 | 0.5 | X-1 | 20 | Y-1 | 32 | 100 | ◎◎◎ | ◎ |
| Example 8 | A-1 | 47.5 | B-2 | 0.5 | X-1 | 20 | Y-1 | 32 | 100 | ◎◎◎ | ◎ |
| Example 9 | A-1 | 47.5 | B-3 | 0.5 | X-1 | 20 | Y-1 | 32 | 100 | ◎◎◎ | ◎ |
| Example 10 | A-1 | 47.5 | B-4 | 0.5 | X-1 | 20 | Y-1 | 32 | 100 | ◎◎◎ | ◎ |
| Example 11 | A-1 | 47.5 | B-5 | 0.5 | X-1 | 20 | Y-1 | 32 | 100 | ◎◎◎ | ◎ |
| Example 12 | A-1 | 47.5 | B-1 | 0.5 | X-1 | 20 | Y-2 | 32 | 100 | ◎◎◎ | ◎ |
| Example 13 | A-1 | 47.5 | B-1 | 0.5 | X-1 | 20 | Y-3 | 32 | 100 | ◎◎◎ | ◎ |
| Example 14 | A-1 | 47.5 | B-1 | 0.5 | X-1 | 20 | Y-4 | 32 | 100 | ◎◎◎ | ◎ |
| Example 15 | A-1 | 47.5 | B-1 | 0.5 | X-1 | 20 | Y-5 | 32 | 100 | ◎◎◎ | ◎ |
| Example 16 | A-1 | 47.5 | B-1 | 0.5 | X-1 | 20 | Y-6 | 32 | 100 | ◎◎◎ | ◎ |
| Example 17 | A-1 | 47.5 | B-1 | 0.5 | X-2 | 20 | Y-1 | 32 | 100 | ◎◎◎ | ◎ |
| Example 18 | A-1 | 47.5 | B-1 | 0.5 | X-3 | 20 | Y-1 | 32 | 100 | ◎◎◎ | ◎ |

TABLE 1-continued

| | Epoxy compound (A) | | Aliphatic sulfonic acid salt (B) | | Nonionic surfactant (C) | | | | Total for ingredients | Evaluation | |
| | | | | | (C1) | | (C2) | | | | |
| | Type | Parts by mass | Type | Parts by mass | Type | Parts by mass | Type | Parts by mass | Parts by mass | Adhesive properties | Fluff |
|---|---|---|---|---|---|---|---|---|---|---|---|
| Example 19 | A-1 | 47.5 | B-1 | 0.5 | X-4 | 20 | Y-1 | 32 | 100 | ⊚⊚⊚ | ⊚ |
| Example 20 | A-1 | 47.5 | B-1 | 0.5 | X-5 | 20 | Y-1 | 32 | 100 | ⊚⊚⊚ | ⊚ |
| Example 21 | A-1 | 47.5 | B-1 | 0.5 | X-6 | 20 | Y-1 | 32 | 100 | ⊚⊚⊚ | ⊚ |
| Example 22 | A-1 | 47.5 | B-1 | 0.5 | X-7 | 20 | Y-1 | 32 | 100 | ⊚⊚⊚ | ⊚ |
| Example 23 | A-1 | 47.5 | B-1 | 0.5 | X-8 | 20 | Y-1 | 32 | 100 | ⊚⊚⊚ | ⊚ |
| Example 24 | A-1 | 47.5 | B-1 | 0.5 | X-9 | 20 | Y-1 | 32 | 100 | ⊚⊚⊚ | ⊚ |
| Example 25 | A-1 | 47.5 | B-1 | 0.5 | X-10 | 20 | Y-1 | 32 | 100 | ⊚⊚⊚ | ⊚ |
| Example 26 | A-1 | 47.5 | B-1 | 0.5 | X-11 | 20 | Y-1 | 32 | 100 | ⊚⊚⊚ | ⊚ |
| Example 27 | A-1 | 47.5 | B-1 | 0.5 | X-12 | 20 | Y-1 | 32 | 100 | ⊚⊚⊚ | ⊚ |
| Example 28 | A-1 | 47.5 | B-1 | 0.5 | X-13 | 20 | Y-1 | 32 | 100 | ⊚⊚⊚ | ⊚ |
| Example 29 | A-1 | 47.5 | B-1 | 0.5 | X-14 | 20 | Y-1 | 32 | 100 | ⊚⊚⊚ | ⊚ |
| Example 30 | A-1 | 47.5 | B-1 | 0.5 | X-1 | 52 | — | 0 | 100 | ⊚⊚⊚ | ⊚ |
| Example 31 | A-1 | 47.5 | B-6 | 0.5 | X-1 | 20 | Y-1 | 32 | 100 | ⊚⊚⊚ | ⊚ |
| Example 32 | A-1 | 47.5 | B-7 | 0.5 | X-1 | 20 | Y-1 | 32 | 100 | ⊚⊚⊚ | ⊚ |
| Example 33 | A-1 | 47.5 | B-1 | 0.5 | — | 0 | Y-1 | 52 | 100 | ⊚⊚⊚ | ○ |
| Example 34 | A-1 | 47.5 | B-1 | 5 | X-1 | 20 | Y-1 | 27.5 | 100 | ⊚⊚ | ⊚ |
| Example 35 | A-1 | 47.5 | B-8 | 0.5 | X-1 | 20 | Y-1 | 32 | 100 | ⊚⊚ | ⊚ |
| Example 36 | A-1 | 47.5 | B-9 | 0.5 | X-1 | 20 | Y-1 | 32 | 100 | ⊚⊚ | ⊚ |
| Example 37 | A-1 | 47.5 | B-10 | 0.5 | X-1 | 20 | Y-1 | 32 | 100 | ⊚⊚ | ⊚ |
| Example 38 | A-1 | 47.5 | B-11 | 0.5 | X-1 | 20 | Y-1 | 32 | 100 | ⊚⊚ | ⊚ |
| Example 39 | A-1 | 47.5 | B-12 | 0.5 | X-1 | 20 | Y-1 | 32 | 100 | ⊚ | ⊚ |
| Example 40 | A-1 | 47.5 | B-12 | 5 | X-1 | 20 | Y-1 | 27.5 | 100 | ○ | ⊚ |
| Example 41 | A-1 | 47.5 | B-12 | 5 | — | 0 | Y-1 | 47.5 | 100 | ○ | ○ |
| Comparative example 1 | A-1 | 47.5 | b-1 | 0.5 | X-1 | 20 | Y-1 | 32 | 100 | X | ⊚ |
| Comparative example 2 | A-1 | 99.5 | B-1 | 0.5 | — | 0 | — | 0 | 100 | ⊚⊚ | X |
| Comparative example 3 | A-1 | 68 | — | 0 | — | 0 | Y-1 | 32 | 100 | X | X |
| Comparative example 4 | A-1 | 80 | b-2 | 5 | — | 0 | Y-7 | 15 | 100 | X | ○ |

Details of the epoxy compounds (A) listed in Table 1 are as follows.

(Epoxy Compounds (A))

A-1: bisphenol A diglycidyl ether (epoxy equivalent: greater than or equal to 184 and less than or equal to 194)

A-2:30 mole polyoxyethylene adduct of lauryl alcohol monoglycidyl ether

A-3:20 mole polyoxyethylene adduct of p-ter-butylphenol monoglycidyl ether

Details of the aliphatic sulfonic acid salts (B) listed in Table 1 are indicated in Table 2. The structures of the aliphatic sulfonic acid salts (B) are indicated in the "Structure" column. The mass ratios of the aliphatic sulfonic acid salt (B1) having a primary sulfonic acid group and the aliphatic sulfonic acid salt (B2) having a secondary sulfonic acid group are indicated in the "Ratio (Primary sulfonic acid group:Secondary sulfonic acid group)" column.

TABLE 2

| Aliphatic sulfonic acid salt (B) | Structure | Ratio (Primary sulfonic acid group:Secondary sulfonic acid group) |
|---|---|---|
| B-1 | Mixture of sodium C14 to C16 alkane sulfonates | 20:80 |
| B-2 | Mixture of sodium C14 to C16 alkane sulfonates | 1:99 |
| B-3 | Mixture of sodium C14 to C16 alkane sulfonates | 30:70 |
| B-4 | Mixture of sodium C8 alkane sulfonates | 20:80 |
| B-5 | Mixture of sodium C20 alkane sulfonates | 20:80 |
| B-6 | Mixture of sodium C12 alkane sulfonates | 20:80 |
| B-7 | Mixture of sodium C24 alkane sulfonates | 20:80 |
| B-8 | Mixture of C14 to C16 alkane sulfonic acid dibutylethanolamine salts | 20:80 |
| B-9 | Mixture of magnesium bis(C14 to C16 alkane sulfonates) | 20:80 |
| B-10 | Mixture of sodium C14 to C16 alkane sulfonates | 0:100 |
| B-11 | Mixture of sodium C14 to C16 alkane sulfonates | 100:0 |
| B-12 | Dioctyl sodium sulfosuccinate | 0:100 |
| b-1 | Sodium dodecyl benzenesulfonate | — |
| b-2 | 120-mole polyoxyethylene adduct of ammonium salt of monostyrenated phenyl ether sulfuric acid ester | — |

Details of the nonionic surfactants (C) listed in Table 1 are as follows.

(Nonionic surfactants (C1) having a single ester bond and an ether bond in their molecules)

X-1: ester of palmitic acid and a compound with 6 moles of ethylene oxide and 2 moles of propylene oxide randomly added to 1-nonanol X-2: ester of palmitic acid and a compound with 5 moles of ethylene oxide added to 1-nonanol X-3: ester of lauric acid and a compound with 6 moles of ethylene oxide and 2 moles of propylene oxide randomly added to 2-ethylhexyl alcohol X-4: ester of lauric acid and a compound with 6 moles of ethylene oxide added to 2-ethylhexyl alcohol X-5: ester of stearic acid and a compound with 22 moles of ethylene oxide and 9 moles of propylene oxide randomly added to 1-butanol X-6: ester of stearic acid and a compound with 10 moles of ethylene oxide added to 1-butanol X-7: ester of oleic acid and a compound with 4 moles of ethylene oxide and 2 moles of propylene oxide randomly added to 1-hexanol X-8: ester of oleic acid and a compound with 7 moles of ethylene oxide added to 1-hexanol X-9: ester of lauric acid and a compound with 3 moles of ethylene oxide and 3 moles of propylene oxide randomly added to isotridecyl alcohol X-10: ester of lauric acid and a compound with 4 moles of ethylene oxide added to isotridecyl alcohol X-11: ester of lauric acid and a compound with 4 moles of ethylene oxide and 3 moles of propylene oxide randomly added to lauryl alcohol X-12: ester of lauric acid and a compound with 5 moles of ethylene oxide added to lauryl alcohol X-13: ester of hexanoic acid and a compound with 2 moles of ethylene oxide and 2 moles of propylene oxide randomly added to 2-decyltetradecanol X-14: ester of hexanoic acid and a compound with 4 moles of ethylene oxide added to 2-decyltetradecanol (Nonionic Surfactants (C2) not Having an Ester Bond in their Molecules)

Y-1: compound with 31 moles of ethylene oxide and 4 moles of propylene oxide randomly added to tristyrenated phenol Y-2: compound with 27 moles of ethylene oxide and 3 moles of propylene oxide randomly added to distyrenated phenol Y-3: compound with 17 moles of ethylene oxide added to tristyrenated phenol Y-4: compound with 9 moles of ethylene oxide added to dodecyl alcohol Y-5: compound with 6 moles of ethylene oxide and 2 moles of propylene oxide randomly added to isononanol Y-6: compound with 15 moles of ethylene oxide added to dodecylamine Y-7: 40-mole polyoxyethylene adduct of monostyrenated phenyl ether

Experimental Part 2 (Sizing of Inorganic Fibers and Preparation of Composite Materials)

The sizing agent of each example prepared in Experimental Part 1 was diluted with water to prepare an aqueous solution with a solid content of 2% and was placed in a treatment bath. Unsized carbon fibers (tensile strength: 3500 MPa; tensile elasticity: $2.3 \times 10^5$ MPa; 12000 filaments)

obtained from polyacrylonitrile fibers were continuously immersed in the treatment bath and the sizing agent was applied by adjusting a wringing condition of rollers such that the amount of the sizing agent adhered (excluding solvent) was consistently at 2% of the carbon fibers.

Fiber bundles in strand form of the carbon fibers, to which the sizing agent was adhered, were conveyed through rollers to be opened. The opened fiber bundles were then passed through a resin tank containing a vinyl ester resin, used as a matrix resin, to be impregnated with the vinyl ester resin. The vinyl ester resin used was Ripoxy (registered trademark) R-804B, produced by Showa Denko K. K. (using a methyl ethyl ketone peroxide curing agent produced by the same company). After impregnation with the vinyl ester resin, pultrusion molding was performed by passing through a curing die of 1 m length set to 140° C. to prepare a composite material. During the pultrusion molding, the sizing agent was cured together with the matrix resin.

Experimental Part 3 (Evaluation)

The sizing agents of Examples 1 to 41 and Comparative Examples 1 to 4 were evaluated for adhesive properties and the presence or absence of fluff in the inorganic fibers to which the sizing agent is adhered. The procedures of the respective tests are described below. Additionally, the results of these evaluations are shown in the "Adhesive properties" and "Fluff" columns of Table 1.

(Adhesive Properties)

The adhesive properties were evaluated by measuring the stress using a micro-droplet method with commercially available composite material interfacial property evaluation equipment. FIG. 1 shows a schematic view of the composite material interfacial property evaluation equipment 10.

In Experimental Part 2, a single carbon fiber 12 was taken out from a bundle of carbon fibers with the sizing agent adhered, and both ends of the carbon fiber 12, while in a tensioned state, were fixed with an adhesive agent 14 to a plate-like quadrilateral frame-shaped holder 11.

Next, a matrix resin mixed at a ratio of epoxy resin (epoxy equivalent: 190; tradename: jER828 produced by Mitsubishi Chemical Corporation) to BF3 monoethylamine salt (tradename: boron trifluoride monoethylamine produced by Stella Chemifa Corporation)=100/3 (mass ratio) was applied to the carbon fiber 12 to form a resin droplet 13 with a diameter of approximately 70 μm and then cured by heating for 90 minutes at 160° C. in an air atmosphere.

In an equipment main body not shown in the drawing, two plate-shaped blades 17 and 18, each with one side formed into a tapered vertical cross-section, are mounted in such a position that their tip portions 17a and 18a face each other.

The holder 11, which secures the carbon fiber 12 with the resin droplet 13, was mounted on a base plate 16, which is fixed to the equipment main body, at a position where the carbon fiber 12 is sandwiched between the tip portions 17a and 18a of the two blades 17 and 18. A load cell 15 is connected to the base plate 16 to measure the stress applied to the base plate 16. The maximum stress F that occurs when the resin droplet 13 is peeled off from the carbon fiber 12 by the tip portions 17a and 18a of the blades 17 and 18 as the holder 11 moves along the fiber axis at a speed of 5 mm/minute was measured by the load cell 15.

Using the measured values, the interfacial shear strength t was calculated according to Numerical Formula 1 below. This procedure was repeated 20 times to determine the average value of the interfacial shear strength.

$$\tau = F/\pi DL \qquad \text{Numerical Formula 1}$$

In Numerical Formula 1,

F represents the maximum stress (N) that occurs when the resin droplet 13 peels off from the carbon fiber 12, D represents the diameter (m) of the carbon fiber 12, and L represents the diameter (m) along the direction of extraction of the resin droplet 13.

Evaluation Criteria for Adhesive Properties

◎◎◎ (superior): The interfacial shear strength was greater than or equal to 75.

◎◎ (excellent): The interfacial shear strength was greater than or equal to 70 but less than 75.

◎ (good): The interfacial shear strength was greater than or equal to 65 but less than 70.

○ (acceptable): The interfacial shear strength was greater than or equal to 60 but less than 65.

x (poor): The interfacial shear strength was less than 60.

(Fluff)

Five chromed stainless steel rods of 2 mm diameter were prepared. The stainless steel rods were disposed in a zigzag pattern at intervals of 15 mm such that the carbon fiber bundle with the sizing agent adhered would pass along in contact with the surfaces of the stainless steel rods at a contact angle of 120°. The carbon fiber bundle was arranged in a zigzag manner between the stainless steel rods and a tension of 1 kg weight was applied. Immediately before the wind-up roll, the carbon fiber bundle was sandwiched between two sheets of 10 cm×10 cm urethane foam, with a load of 1 kg weight applied thereto and rubbed for 5 minutes at a speed of 1 m/minute. The weight of fluff adhered to the urethane foam during this time was measured and evaluated based on the criteria indicated below.

Evaluation Criteria for Fluff

◎ (good): Less than 0.15 mg/m.

○ (acceptable): Greater than or equal to 0.15 mg/m and less than 0.20 mg/m.

x (poor): Greater than or equal to 0.20 mg/m.

According to the results of Table 1, the present invention suppresses fluff in the inorganic fibers with the sizing agent adhered. Additionally, it is possible to improve the adhesive properties between the inorganic fibers and the matrix resin in the fiber-reinforced resin composite material. In addition, it has been confirmed that, as with carbon fibers, the effects of suppression of fluff and improvement of adhesive properties are also observed with glass fibers, which are inorganic fibers.

REFERENCE SIGNS LIST

10 . . . composite material interfacial property evaluation equipment

11 . . . holder

12 . . . carbon fiber

13 . . . resin droplet

14 . . . adhesive agent

15 . . . load cell

16 . . . base plate

17, 18 . . . blade

The invention claimed is:

1. An inorganic fiber sizing agent comprising an epoxy compound (A), an aliphatic sulfonic acid salt (B), and a nonionic surfactant (C), wherein taking the sum of the contents of the epoxy compound (A), the aliphatic sulfonic acid salt (B), and the nonionic surfactant (C) as 100 parts by mass, the inorganic fiber sizing agent contains the aliphatic sulfonic acid salt (B) at a content of greater than or equal to 0.01 parts by mass and less than or equal to 0.9 parts by mass, wherein the aliphatic sulfonic acid salt (B) is an aliphatic sulfonic acid alkali metal salt.

2. The inorganic fiber sizing agent according to claim 1, wherein the aliphatic sulfonic acid salt (B) includes an aliphatic sulfonic acid salt (B1) that has a primary sulfonic acid group and an aliphatic sulfonic acid salt (B2) that has a secondary sulfonic acid group.

3. The inorganic fiber sizing agent according to claim 1, wherein the nonionic surfactant (C) includes a nonionic surfactant (C1) that has a single ester bond and an ether bond in its molecule.

\* \* \* \* \*